(12) United States Patent
Hintermeier et al.

(10) Patent No.: US 11,141,906 B2
(45) Date of Patent: Oct. 12, 2021

(54) METHOD AND APPARATUS FOR BLOW MOULDING OF CONTAINERS WITH A MOVABLE BASE PART

(71) Applicant: KRONES AG, Neutraubling (DE)

(72) Inventors: Martin Hintermeier, Mintraching (DE); Gerald Huettner, Vilseck (DE); Ludovic Laine, Hainsacker (DE); Andreas Steiner, Wenzenbach (DE)

(73) Assignee: KRONES AG

( * ) Notice: Subject to any disclaimer, the term of this patent is extended or adjusted under 35 U.S.C. 154(b) by 77 days.

(21) Appl. No.: 16/473,219

(22) PCT Filed: Dec. 12, 2017

(86) PCT No.: PCT/EP2017/082356
§ 371 (c)(1),
(2) Date: Jun. 24, 2019

(87) PCT Pub. No.: WO2018/114462
PCT Pub. Date: Jun. 28, 2018

(65) Prior Publication Data
US 2019/0315038 A1    Oct. 17, 2019

(30) Foreign Application Priority Data
Dec. 23, 2016   (DE) .................... 10 2016 125 586.6

(51) Int. Cl.
*B29C 49/06*     (2006.01)
*B29C 49/12*     (2006.01)
(Continued)

(52) U.S. Cl.
CPC .............. *B29C 49/06* (2013.01); *B29C 49/12* (2013.01); *B29C 49/36* (2013.01); *B29C 49/48* (2013.01);
(Continued)

(58) Field of Classification Search
CPC ......... B29C 49/06; B29C 49/12; B29C 49/36; B29C 49/48; B29C 49/78; B29C 2049/4892; B29L 2031/7158
See application file for complete search history.

(56) References Cited

U.S. PATENT DOCUMENTS

| 3,949,034 A | 4/1976 | Uhlig ............................. 264/89 |
| 4,584,158 A | 4/1986 | Nilsson et al. ............... 264/529 |

(Continued)

FOREIGN PATENT DOCUMENTS

| DE | 3408740 | 4/1991 | ............ B29C 49/00 |
| DE | 102004014653 | 10/2005 | ............ B29C 49/18 |

(Continued)

OTHER PUBLICATIONS

German Search Report (w/machine translation) issued in application No. 10 2016 125 586.6, dated Sep. 12, 2017 (10 pgs).

(Continued)

*Primary Examiner* — Matthew J Daniels
*Assistant Examiner* — Shibin Liang
(74) *Attorney, Agent, or Firm* — Hayes Soloway P.C.

(57) ABSTRACT

A method for forming plastic preforms into plastic bottles includes introducing a plastic preform to be expanded into a blow mould, wherein this blow mould has at least two side parts and a bottom part which is movable in a longitudinal direction of the plastic preform in relation to these side parts; introducing a rod-shaped body through a mouth of the plastic preform into the interior of the plastic preform; applying a first pressure to the plastic preform; applying a second pressure to the plastic preform, wherein this second pressure differs from the first pressure and is higher than the first pressure; applying a third pressure to the plastic preform, wherein this third pressure differs from the second pressure and is higher than the second pressure. After (Continued)

applying the third pressure to the plastic preform, the bottom part is moved in the longitudinal direction of the plastic preform towards the latter.

14 Claims, 4 Drawing Sheets

(51) Int. Cl.
*B29C 49/36* (2006.01)
*B29C 49/48* (2006.01)
*B29C 49/78* (2006.01)
*B29L 31/00* (2006.01)

(52) U.S. Cl.
CPC ...... *B29C 49/78* (2013.01); *B29C 2049/4892* (2013.01); *B29L 2031/7158* (2013.01)

(56) References Cited

U.S. PATENT DOCUMENTS

| | | | | |
|---|---|---|---|---|
| 9,044,892 | B2 | 6/2015 | Hirdina | B29C 49/783 |
| 9,339,969 | B2 | 5/2016 | Asbrand et al. | B29C 49/783 |
| 2014/0203481 | A1 | 7/2014 | Derrien et al. | B29B 49/78 |
| 2015/0290867 | A1* | 10/2015 | Derrien | B29C 49/18 |
| | | | | 264/526 |
| 2015/0298386 | A1* | 10/2015 | Letestu | B29C 49/78 |
| | | | | 264/40.5 |
| 2017/0021550 | A1 | 1/2017 | Derrien et al. | B29C 49/06 |
| 2017/0326780 | A1 | 11/2017 | Protais et al. | B29C 49/48 |

FOREIGN PATENT DOCUMENTS

| | | | |
|---|---|---|---|
| DE | 102012110023 | 4/2014 | B29C 49/18 |
| FR | 3019486 | 10/2015 | B29C 49/18 |
| FR | 3029133 | 6/2016 | B29C 49/48 |
| FR | 3049133 | 6/2016 | H04B 1/76 |

OTHER PUBLICATIONS

International Preliminary Report on Patentability (w/translation) issued in application No. PCT/EP2017/082356, dated Jun. 25, 2019 (11 pgs).

International Search Report and Written Opinion (w/translations) issued in application No. PCT/EP2017/082356, dated Apr. 4, 2018 (19 pgs).

Chinese Office Action (w/machine translation) issued in application No. 201780079565.5, dated Nov. 23, 2020, (13 pgs).

* cited by examiner

METHOD AND APPARATUS FOR BLOW MOULDING OF CONTAINERS WITH A MOVABLE BASE PART

BACKGROUND OF THE INVENTION

The present invention relates to a method and an apparatus for transforming plastic parisons into plastic containers and in particular plastic bottles. Such methods and apparatus have been known for a long time from the prior art. In this case heated plastic parisons are usually introduced into blow moulds and pressurised inside these blow moulds, so that a plastic container or a plastic bottle can be shaped. In this case different pressure stages are usually applied to the plastic parisons. Thus, it is for example known that first of all a preliminary blow moulding pressure is applied which serves for the first expansion of the container, followed by an intermediate blow moulding pressure and lastly a final blow moulding pressure. Furthermore, it is known from the prior art that for expansion of the containers a so-called stretching rod is inserted into the containers in order to stretch them. In addition, methods are also known from the prior art in which during the expansion process a base part of the blow mould is advanced towards the containers. Such methods are also designated as active base methods.

The object of the present invention is to improve such methods in particular with regard to the shaping of the plastic containers. In particular the shaping of the base region of such containers should be improved.

SUMMARY OF THE INVENTION

In a method according to the invention for transforming plastic parisons into plastic bottles first of all a plastic parison which is to be expanded is introduced into a blow mould, wherein this blow mould has at least two lateral parts and a base part which is movable relative to these lateral parts in a longitudinal direction of the plastic parison. In a further method step a rod-shaped body is introduced through a mouth of the plastic parison into the interior of the plastic parison, in particular in order to stretch this in the longitudinal direction. In a further method step a first pressure is applied to the plastic parison. Furthermore, a second pressure is applied to the plastic parison, wherein this second pressure deviates from the first pressure and is preferably higher than the first pressure. In a further method step a third pressure is applied to the plastic parison, wherein this third pressure deviates from the second pressure and is preferably higher than the second pressure.

In a first embodiment according to the invention, before the third pressure is applied to the plastic parison and in particular at least temporarily while the second pressure is applied to the plastic parison, the base part is moved towards the plastic parison in the longitudinal direction of the plastic parison.

Thus, in this embodiment it is proposed that while the intermediate blow moulding pressure (which is designated here as the second pressure) is applied to the plastic parison the base part is moved towards the plastic parison. In this case it is possible and preferred that the entire advancing movement takes place during this phase, that is to say during the application of the second pressure, that is to say the intermediate blow moulding pressure.

However, it would also be conceivable that at least a temporal proportion of this movement also takes place in another phase for instance while the first pressure is applied to the plastic parison and/or while the third pressure is applied to the plastic parison.

In a second embodiment according to the invention, during and/or after and in particular after the application of the third pressure to the plastic parison the base part is moved towards the plastic parison in the longitudinal direction of the plastic parison.

In this embodiment the advancing of the base part takes place in particular during a rinsing phase of the plastic container, and preferably during a time period in which the pressure in the container drops again. Preferably in this case the base part can remain advanced towards the plastic parison until the end of this rinsing phase. During the rinsing phase a lower pressure prevails in the container than during the application of the third pressure or during the final blow moulding. Due to this lower pressure it is more easily possible to advance the base part, since it only has to approach against a lower pressure.

In a third embodiment according to the invention, during the application of at least one of the pressures to the plastic parison the base part is advanced towards the plastic parison in the longitudinal direction of the plastic parison in at least two time intervals spaced apart from one another in time.

All of the three variants according to the invention which are described here are distinguished in that the base part is advanced towards the plastic parison during the application of compressed air to the plastic parison. However, the respective time intervals or frequencies in which this advancing of the base part takes place are different. The directly following description relates to all of the aforementioned embodiments which are in each case applicable to all embodiments according to the invention. Then preferred variants are described which relate to the individual embodiments. In this case advantageously the described pressures are not constant during the respective intervals. The first pressure and the second pressure preferably increase in the course of the respective time intervals. On average, however, the second pressure is higher than the first pressure. The third pressure is advantageously substantially constant over a predetermined time period.

Preferably the application of the second pressure to the plastic parison directly follows the application of the first pressure to the plastic parison. Preferably the application of the third pressure to the plastic parison directly follows the application of the second pressure to the plastic parison.

The changing over to the different pressures preferably takes place by operation of valves. Thus for example in order to achieve the transition from the first pressure to the second pressure a first valve, which regulates or effects the delivery of the first pressure to the plastic parisons, can be closed and instead of this a second valve, which regulates or effects the delivery of the second pressure, can be opened. Accordingly, during the changeover from the second pressure to the third pressure a valve which effects the delivery of the second pressure (more precisely the delivery of air under the second pressure) can be closed and instead a further valve which effects the delivery of air under the third pressure can be opened.

Thus a transition between the individual pressures is preferably triggered by the switching of at least one valve and preferably several valves.

A rinsing phase during which the plastic containers are rinsed preferably follows the phase in which the third pressure acts on the plastic container. Also in this case this rinsing phase can be initiated by an operation of valves, in particular in that a valve which provides the third pressure P2 is closed and instead a valve which makes the rinsing operation possible is opened. The pressure during the rinsing phase is preferably lower than the third pressure.

Thus, in the context of the method according to the invention a movement of the base part is proposed and so a movement of the base part during the expansion of the plastic parison is proposed. It is pointed out that although the above-mentioned method steps are carried out in a specific sequence, they can also proceed simultaneously and preferably also proceed simultaneously. This it is for example possible that the rod-like body is introduced into the plastic parison through the mouth thereof and simultaneously the first pressure is applied to the plastic parison. Furthermore, it is also possible that the aforementioned pressures are not constant, but are changed, for example raised or lowered, over a certain time period.

In a further preferred method a movement of the rod-like body linearly and/or at a constant speed takes place. This means that the rod-like body is introduced into the plastic container with a linear movement. The rod-like body is preferably introduced so far into the plastic parison that it touches the bottom. Thus the rod-like body is suitable and intended to stretch the plastic parison in the longitudinal direction thereof.

In a further preferred method a movement of the rod-like body takes place linearly and/or at a constant speed. Advantageously in this case the base part is advanced towards the plastic parison and/or in the direction of the above-mentioned rod-like body.

In a further preferred method the shaped plastic container is removed from the blow mould in particular after the application of the third pressure (and preferably after a rinsing phase and a pressure relief phase). The blow mould is preferably opened in order to be able to introduce the plastic parison into it. In this case particularly preferably a lateral part of the blow mould is pivoted relative to the second lateral part of the blow mould, preferably relative to an axis which extends parallel to a longitudinal direction of the plastic parison to be expanded. After the introduction of the plastic parison the blow mould is closed again in the same way by pivoting.

In a further advantageous embodiment the plastic container is moved during its expansion on a predetermined transport path and in particular on a circular transport path.

Furthermore, it is possible that compressed air is applied to the plastic container through the rod-like body. However, it would also be possible that the compressed air necessary for expanding the plastic parison is guided between the rod-like body and a mouth of the plastic parison. In a further preferred method the blow mould is locked before the air is applied, and particularly preferably the blow mould is unlocked again after the application of air and before the opening.

In a further preferred method the rod-like body is at least partially retracted before or during the advancement of the base part. In this way a collision between the rod-like body and the base part (optionally with the wall of the plastic parison lying between them) is prevented.

In a further preferred method the base part is advanced by a distance which is greater than 5 mm, preferably greater than 10 mm and particularly preferably greater than 15 mm and/or the base part is advanced by a distance which is less than 30 mm, preferred less than 25 mm and particularly preferably less than 20 mm. These respective advancing distances also depend upon a container to be produced. However, it has been shown that these relatively small advancing distances are particularly suitable for producing or shaping bases.

In a further preferred method the plastic parison or the container produced therefrom is relieved of pressure again after the application of the third pressure. In this way, after the final blow moulding of the container, pressure can again be released from the container so that this can finally be removed from the blow mould. In this connection it is pointed out that in the context of the present application, for the sake of simplicity, reference is made predominantly to the application of pressure to the plastic parison, although starting from a certain time (in any case already starting from the application of the third pressure) a shaped container is already present inside the blow mould.

In particular in the first embodiment according to the invention, the base part is advanced at least temporarily while the second pressure is applied to the plastic parison. In this case it is possible that the feeding movement also takes place, still temporarily, during the application of the first pressure and particularly preferably the advancing of the base part takes place during a changeover from the first pressure to the second pressure.

Advantageously the transitions between the individual pressures differ by a slight lowering of the pressure in the course of time. Thus preferably the respective subsequent pressure, that is to say for example the second pressure or the third pressure, is defined starting from a time at which it rises again starting from a minimum value.

However, at a time at which the third pressure is reached, the base part is advantageously already completely advanced towards the plastic parison and/or moved in an upper position.

In a further embodiment the base part is advanced during a period of time which is between one second and 20 seconds, preferably between one second and 15 seconds, preferably between two seconds and ten seconds and particularly preferably between two seconds and five seconds. A speed at which the base part is advanced towards the plastic parison is advantageously adjustable.

In all of the above-mentioned embodiments the second pressure is preferably greater than 3.5 bar, preferably greater than 5 bar, preferably greater than 7 bar and particularly preferably greater than 10 bar and particularly preferably greater than 12 bar. Furthermore, the second pressure is preferably less than 20 bar, preferably less than 18 bar and particularly preferably less than 17 bar.

In a further advantageous embodiment which is applicable in particular for the second configuration described above, the rod-like body is at least partially retracted before the application of the third pressure to the plastic parison. Advantageously, the rod-like body is retracted at least so far as is necessary in order to advance the base. Advantageously, the rod-like body is retracted completely in a further method step. In this embodiment also the base part is in any case advanced completely in its upper position or upwards when the third pressure is reached. In this embodiment, during the application of the third pressure to the plastic parison, the base part is advantageously advanced completely, that is to say to the plastic parison or to the container already shaped at this time.

For all the embodiments of the invention the first pressure is advantageously in a range between 1 and 12 bar, preferably between 1 and 10 bar and particularly preferably between 1 and 8 bar.

The third pressure preferably lies in a range between 15 and 50 bar, preferably between 17 and 40 bar, particularly preferably between 20 and 40 bar and particularly preferably between 20 and 38 bar.

In a further advantageous embodiment which relates in particular to the above-mentioned third embodiment of the invention, the base part is at least partially retracted again (in the direction of a lower rest position) between the two intervals which are spaced apart from one another in time (in which it is advanced towards the plastic parison). Thus, in this embodiment the base part is first of all advanced towards the plastic parison, then at least partially retracted again, in order to be advanced again to the plastic parison. Thus, in this embodiment the base part is advanced towards the plastic parison a number of times.

In the third embodiment a time interval advantageously lies at least partially after the application of the second pressure. At least one time interval preferably lies after the beginning of the application of the second pressure to the plastic parison. Thus, for example it is possible that a first advancing movement towards the plastic parison begins during a preliminary blow moulding process and a further advancing movement only begins at a time after the application of the second pressure or in a time period in which the pressure in the interior of the plastic parison drops again.

Furthermore, it would also be possible that both advancing movements take place at a time after the application of the second pressure to the plastic parison, and particularly preferably also at a time after the third pressure is applied to the plastic parison. In this embodiment both advancing movements can advantageously be carried out in a (time) interval in which a pressure inside the plastic container drops again.

In a further advantageous variant of the third embodiment, both time intervals lie at least partially after the application of the third pressure. In a further embodiment, during time intervals of different lengths, the base part particularly preferably remains in a state advanced towards the plastic parison. In this case it is possible that this first time period (in which the base part is advanced closer to the plastic parison) is longer, for example while the entire application of the third pressure takes place. Furthermore, it is also possible that the second time period is longer. It is also possible that the first time period is advanced only for a very short time, for example the base part is moved upwards and is immediately moved back again.

In a further advantageous method the plastic container is applied with a rinsing pressure after the application with the third pressure. During this phase the pressure inside the container drops significantly. Thus, this rinsing pressure is preferably comparable with the pressure of the intermediate blow moulding, that is to say the above-mentioned second pressure. How far the pressure in the container drops during the flushing depends upon whether or not blowing air is to be recycled. If such compressed air recycling is provided, the pressure inside the container drops to approximately 15-20 bar. This corresponds approximately to the level of the second pressure, that is to say the intermediate blow moulding pressure.

If no recycling is provided or if venting to the environment is to take place, the rinsing pressure drops to approximately 6-10 bar and thus is of the order of magnitude of the pressure during preliminary blow moulding, that is to say the first pressure P1. Advantageously, the container is cooled during the rinsing operation and in particular is cooled by compressed air escaping therefrom. This rinsing phase follows a pressure relief phase, during which the remaining pressure escapes from the container.

These individual pressures or the air are preferably provided by at least one reservoir and preferably several reservoirs. These reservoirs may be for example so-called annular channels which serve for storage of air. During the application to the plastic parisons, the highest pressure preferably prevails in the reservoir or the annular channel which provides the second pressure. This corresponds approximately to the third pressure, but can even be somewhat higher.

Furthermore, the present invention relates to an apparatus for transforming plastic parisons into plastic containers with at least one transport device on which a plurality of transforming stations are arranged, wherein each of these transforming stations has a blow mould which in each case has two lateral parts, which are movable with respect to one another for opening and closing the blow mould, as well as a base part, wherein this base part is movable relative to the lateral parts in a longitudinal direction of the plastic parison and in a closed state of the blow mould, and wherein the apparatus has at least one application device in order to apply a gaseous medium and in particular compressed air to the plastic parisons for expansion thereof, as well as a control device which controls the application of the gaseous medium to the plastic parisons in such a way that first of all a first pressure, then a second pressure which is above the first pressure, and finally a third pressure preferably above the second pressure, are applied to the plastic parisons.

According to the invention the apparatus has a driving device which is suitable and intended to move the base part towards the plastic parisons at least temporarily during the application of the plastic parisons, wherein in a first embodiment according to the invention, before the third pressure is applied to the plastic parison and particularly preferably at least temporarily while the second pressure is applied to the plastic parison, the base part can be advanced towards the plastic parison in the longitudinal direction of the plastic parison. In a second embodiment according to the invention, during or after and in particular after the application of the third pressure to the plastic parison the base part is moved towards the plastic parison in the longitudinal direction of the plastic parison.

In a third embodiment according to the invention, the base part can be advanced towards the plastic parison in the longitudinal direction of the plastic parison in at least two time intervals spaced apart from one another in time.

In this case the second advance preferably serves to produce a kink in the base region.

Advantageously, the apparatus has a rod-like body which, during the expansion of the plastic parisons, can be introduced into the plastic parisons in order to stretch them. The apparatus advantageously also has a driving device for driving this rod-like body. This driving device can be in particular, but not exclusively, an electric motor-powered, hydraulic, pneumatic or magnetic driving device. The apparatus advantageously has a control device which also controls the movement of this rod-like body. Advantageously, a movement of the rod-like body is at least temporarily adapted to a movement of the base part. This means that the rod-like body for example can be retracted by the same range by which the base part is advanced.

In a further advantageous embodiment the two lateral parts are pivotable with respect to one another and particularly preferably are pivotable with respect to an axis which is parallel to a longitudinal direction of the plastic parison.

Therefore within the context of the invention, a process cycle is described in relation to a so-called active base/overstroke method. In this case the base lift is limited to a range between 14.9 mm and 19.9 mm. In a method according to the invention, first of all the plastic parison is placed in the blow mould and preferably then the blow mould is closed and locked. In this phase of the method the base part or the base mould is in its lower end position.

Then the rod-like body or the stretching rod is inserted so far into the plastic that it touches a ridge of the plastic parison. Subsequently the application of the first pressure, that is to say the preliminary blow moulding, is started. In this case it is also possible that this application is already started with the pressure before the rod-like body is inserted. In this way at a low pressure the blowing or the blow moulding process can be monitored.

In a further method step, in the embodiment according to the invention, in particular before the initiation of a lifting of the base and/or an application of the second pressure, the rod-like body or the rinsing rod is raised and in particular moved into a position of base located in or coming to the end position.

Then the base part is preferably advanced towards the plastic parison or moved into its upper end position. In a further method step a final blow moulding with the third pressure takes place. This movement of the base part into its highest position preferably takes place during the intermediate blow moulding with the second pressure. Beyond the end of the third pressure phase (the final blow moulding) the base part is preferably located in its highest position. In a further method step a rinsing takes place, wherein here the rinsing rod or the rod-like body is particularly preferably in a retracted position. Finally the rod-like body also moves back again.

In particular in the second embodiment, after the preliminary blow moulding and the stretching, an intermediate blow moulding takes place, that is to say an application of the second pressure P2 to the plastic parison. Advantageously in this phase of the method the rod-like body moves back at least partially.

In this embodiment, after the application of the third pressure and in particular during rinsing the base is moved into an upper position. However, this can also be initiated already just before the start of the rinsing.

With this embodiment a standard process preferably runs until the end of the application of the third pressure, or a process which only differs in the stretching path, that is to say the movement path of the rod-like body differs from a standard process. Advantageously, during an intermediate blow moulding, that is to say during the application of the second pressure the rod-like body is moved back, for example to a position explained more precisely below. After the application of the third pressure to the plastic container, a rinsing phase preferably takes place in which the pressure is again lowered and in particular a rinsing of the container occurs. During this phase the base part is raised into a so-called boxing phase.

Advantageously, an internal pressure of the container or a rinsing pressure in this phase is between 4 bars and 20 bar, preferably between 6 and 12 bar.

In a further preferred method the base part is moved upwards again after the end of flushing.

This embodiment also offers the advantage that less force is necessary for advancing the base part. Also in this way less pressure is required in an overstroke unit. Finally, wear of the entire system (seals and stops) can also be reduced. In addition, a better control can also be achieved, since the contour is completely blown out. Finally, tensions can also be reduced, since the material can relax for longer.

In a further preferred method, which relates in particular to the third embodiment according to the invention, the base part is moved during the intermediate blow moulding, that is to say during the application of the second pressure, to a high end position and thus stretches the base of the container. Then a rinsing operation takes place and the base part is again moved into its highest and then into its lowest end position, in order to create a fold point, at which the base can be hinged inwards more easily. The end of the blow moulding process takes place in turn as is known from the prior art.

In a second variant a standard process as described above is carried out up to and including the end of the final blow moulding. This means that the base remains in its lowest end position until the end of the application of the third pressure. As mentioned above, this end position can again be located between 14.9 mm and 19.9 mm below the stretching rod position. Then during the rinsing operation the base part is moved into its highest end position and thus the bottom of the container is stretched. After the final stretching the base part moves back into its lowest end position. Now an operation for generation of the kink takes place. For this purpose the base part is moved again into its highest end position and then again into its lowest end position, in order thus to create the kink. This generation of the kink can also take place by multiple repetitions of the movement of the base mould. Then the base part and the stretching rod are moved into their process termination position and the finished container is discharged and transferred to further handling systems.

After this method step, in all embodiments a pressure relief cycle is run through and after the end of this pressure relief cycle the base part is again moved into its lower position. Lastly, after the opening of the blow mould the plastic container is removed as a finally blow moulded bottle. An improved control of the blow moulding speed is achieved by the present invention. A further control can preferably take place by an adjustment of the second pressure P2. In addition, a larger process window is made possible, since the blowing can develop more slowly. In this way a higher container quality is also achieved. An improved control of the wall thicknesses can also take place, in particular more constant wall thicknesses can be achieved. This second pressure P2 is partially also designated as intermediate blow moulding pressure (Pi).

Further advantages exist in that a lower force is necessary during the so-called boxing, that is to say during the movement of the base part, since at the highest third pressure it is not necessary to move against it. In this way the entire transforming station can also be designed for pressures below 30 bar. Less pressure is required and also the assemblies are less stressed.

Preferably it is possible that the base part or a base lifting unit is moved with different pressures, so that the speed of the lifting can be influenced. Furthermore, it is also possible that with the second pressure the speed of the blowing or of the blow moulding process is influenced. In this way larger process windows can be achieved.

BRIEF DESCRIPTION OF THE DRAWINGS

Further advantages and embodiments are apparent from the appended drawings.

In the drawings.

DETAILED DESCRIPTION OF THE INVENTION

Figure 1:
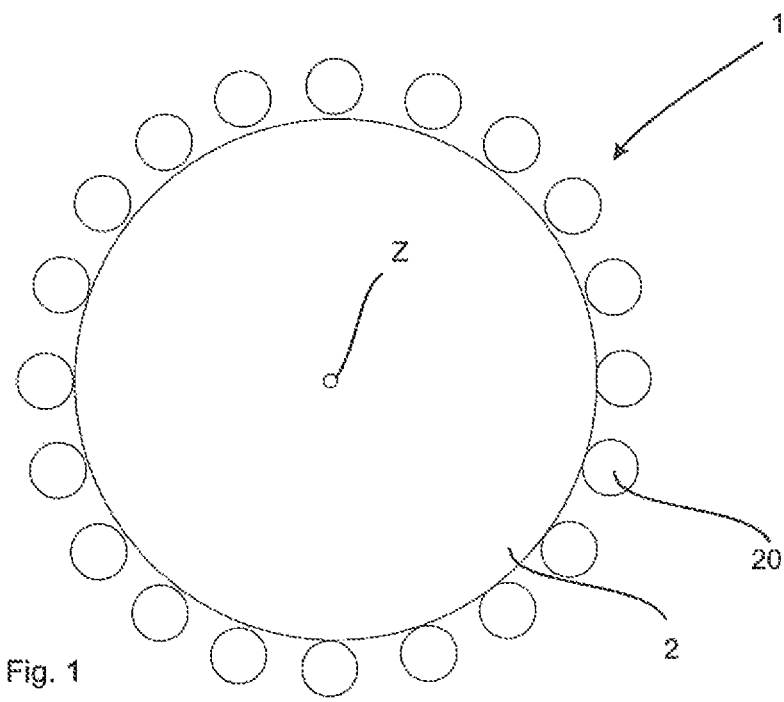
FIG. 1 shows a roughly schematic representation of a system for producing plastic containers.

FIG. 1 shows quite schematically an apparatus 1 according to the invention for producing plastic containers. This apparatus has a carrier 2 which is rotatable with respect to an axis of rotation Z and is configured here as a so-called blow moulding wheel. A plurality of transforming stations 20 are arranged on this blow moulding wheel. During the transformation of the plastic parisons to plastic containers these transforming stations are moved along the transport path P, that is to say along a circular path.

Figure 2:
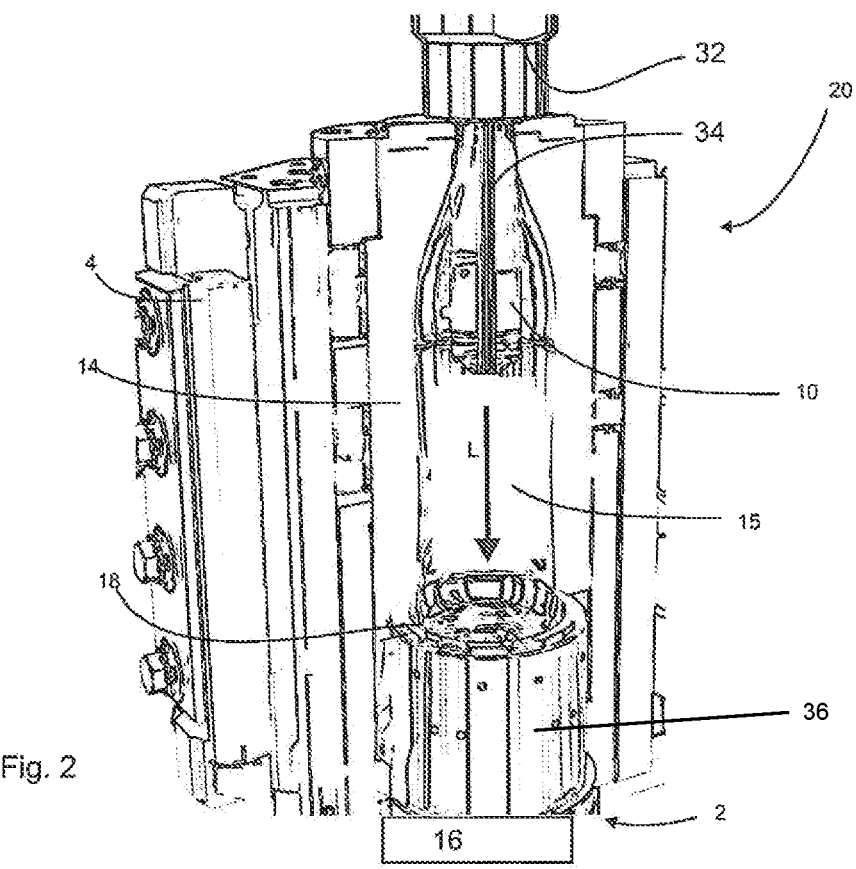
FIG. 2 shows a schematic representation of a transforming station.

FIG. 2 shows a schematic representation of a transforming station 20 or a half of such a transforming station. This has two lateral part carrier parts of which, however, only one lateral part carrier part 4 is shown. These lateral part carrier parts serve in each case for holding blow mould lateral parts, wherein here too only the blow mould lateral part 14 is represented. These blow mould lateral parts form, together with a base part 18, a cavity 15 within which the plastic parisons 10 can be blow moulded to form plastic containers. The reference L relates to a longitudinal direction of the plastic parison. Between the lateral part carrier part 4 and the blow mould lateral part 14 there is arranged a blow mould support shell 16 (and correspondingly also between the second lateral part carrier part (not shown) and the second blow mould lateral part (not shown)).

The reference numeral 32 designates a blow moulding nozzle which serves for application of compressed air to the plastic parisons. By means of this application device the individual air pressures can be applied to the plastic parison. The reference 34 designates the rod-like body or the stretching rod which can be introduced into the container. The base part 18 can be moved by a driving device 36, only schematically illustrated, in the longitudinal direction L relative to the lateral parts. A movement towards the plastic parison is understood in FIG. 1 to be a movement upwards.

Figure 3:
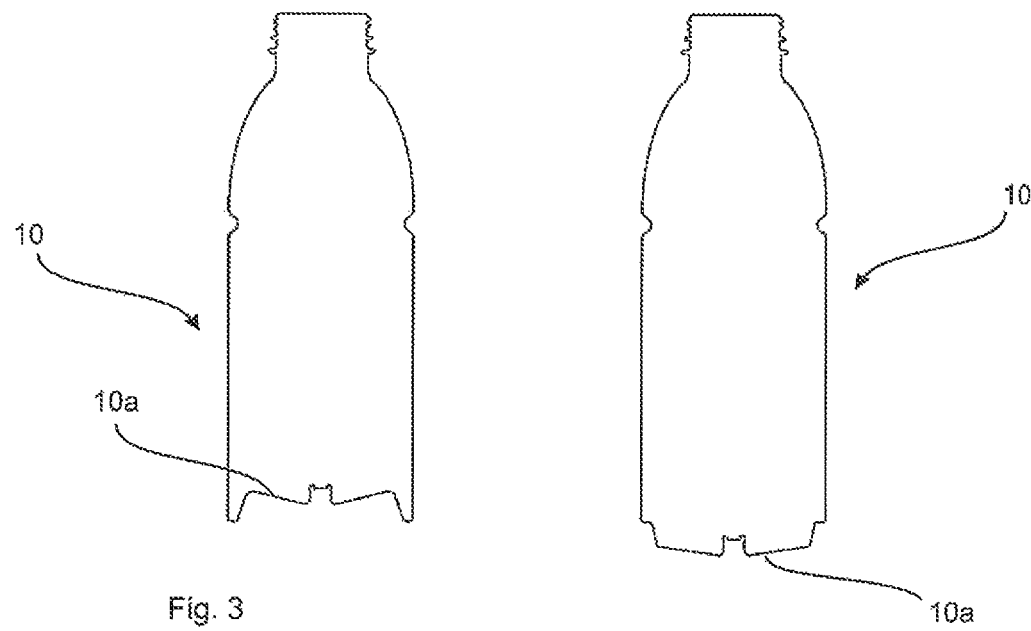
FIG. 3 shows two representations for illustrating the production of the containers.

FIG. 3 shows two representation of a plastic container. In this case the left-hand representation shows a geometry of the container before the boxing phase during rinsing.

The right-hand representation shows a situation after the boxing phase, in which the base 10a of the container was pushed upwards in order to generate a kink.

Figure 4:
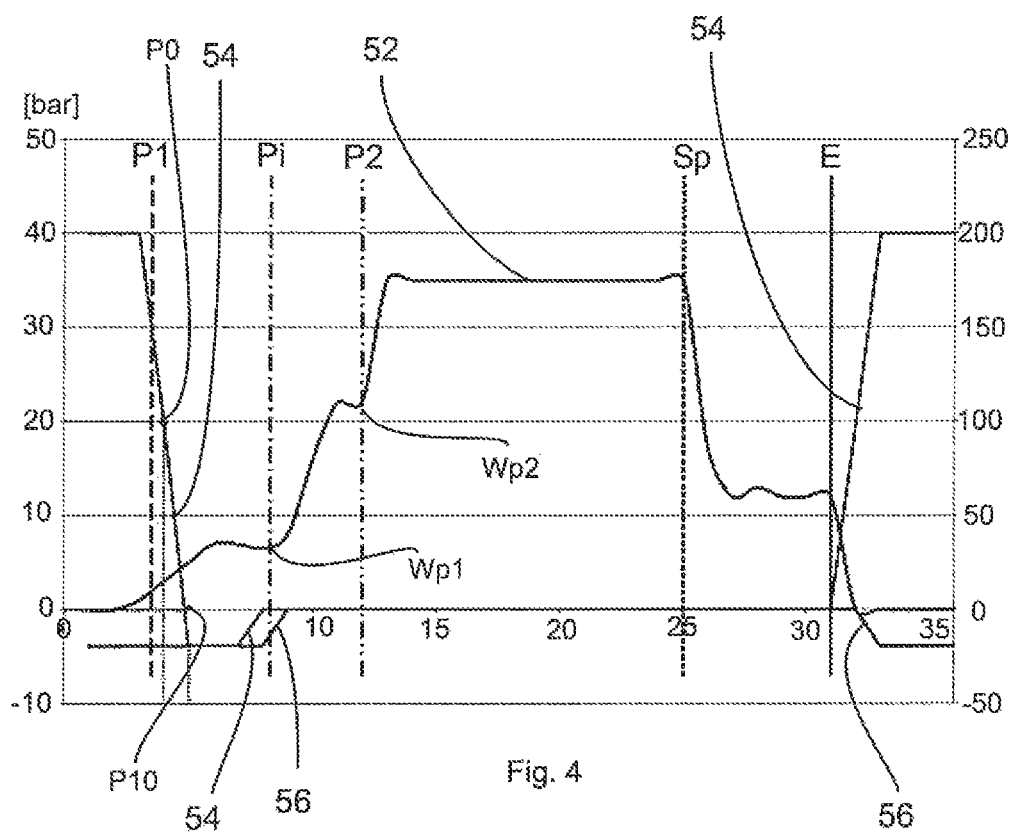
FIG. 4 shows a representation of a method in a first embodiment according to the invention.

FIG. 4 shows a first representation of a method according to the invention. In this case the reference 52 relates to the blow moulding curve or the pressure profile.

The references P1, Pi, P2, Sp and E or the corresponding vertical lines designate respective time periods, from which in each case new pressure stages are used. The second pressure Pi is also designated as intermediate blow moulding pressure. It will be recognised that starting from a time of approximately three seconds a specific pressure P1, the preliminary blow moulding pressure, is applied to the plastic container. At the same time the stretching rod is moved into the container. The reference 54 designates the course of the stretching rod movement. Towards the end of the phase in which the first pressure P1 is applied, the rod-like body is retracted slightly and offset for a short time and also the base part is moved into an upper position.

The entire pressure profile preferably has several inflection points (in the mathematical sense, i.e. points at which the second derivative of a corresponding function would change the plus/minus sign). Preferably, by definition, the first pressure P1 transitions into the second pressure Pi in the region of an inflection point WP1 of the pressure, and in turn this second pressure Pi transitions into the third pressure P2 in the course of an inflection point WP2. The transition from the third pressure P2, which is also designated as the final blow moulding pressure, to the rinsing pressure Sp takes place just before a marked drop in the pressure, and in turn the transition from the rinsing pressure Sp to the relief pressure takes place before a marked drop in the pressure.

Accordingly, the reference 56 designates the course of movement of the base part. Furthermore, it will be seen that in this embodiment during the complete phase of the application of the third pressure P2 to the container the base part remains in the upwardly advanced position. The third pressure P2 first of all rises to a specific level of approximately 35 bar and remains in this phase for a predetermined time period, in this case approximately 12 seconds. In this time interval the container is shaped extensively. After this final blow moulding a rinsing of the container (pressure Sp) takes place, wherein here the pressure again drops to a level of approximately 10 bar. Lastly, in a final phase E (or during an application of the relief pressure E) the container is relieved and the stretching rod is retracted again upwards. In this phase the base part is also retracted again, as can be seen from the last portion of the curve 56.

Figure 5:
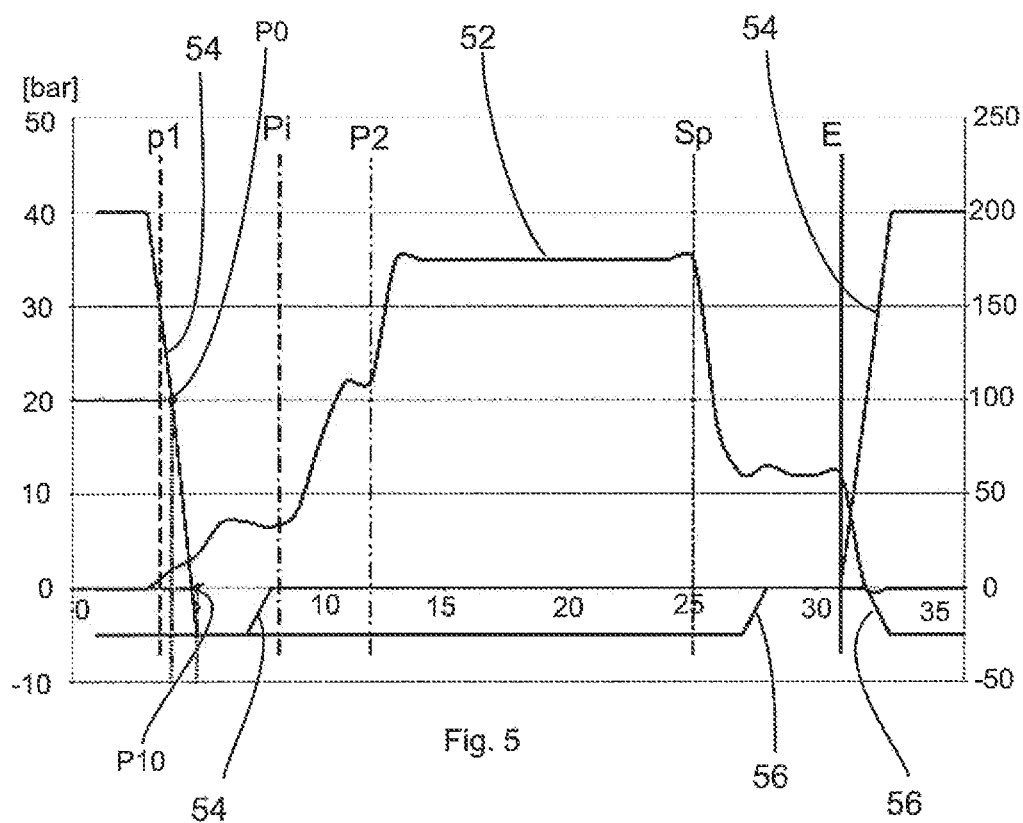
FIG. 5 shows a representation of a method according to the invention in a second embodiment.

FIG. 5 shows a further embodiment of the method according to the invention. The pressure profile 52 is as already described in the preceding method, that is to say that there are no changes here. Also, as in the embodiment shown in FIG. 4, the stretching rod is still retracted a little during the application of the first pressure P1 to the container. The reference P10 designates the position to which the stretching rod is retracted. The reference P0 designates a further position of the stretching rod.

Unlike the embodiment shown in FIG. 4, in the embodiment shown in FIG. 5 the base part here is only advanced upwards during the rinsing phase or the pressure Sp and is reset again during the pressure relief phase E. Thus, in this method, for the entire duration of the application of pressure to the plastic parison or the plastic bottle the base part remains in an (upper) state in which it is advanced towards the plastic bottle.

With regard to the pressure profiles, in all embodiments it can be seen that, as mentioned 20 above, these pressure profiles in each case adjoin one another. In any case, however, an average pressure in the individual phases (preliminary blow moulding, intermediate blow moulding and final blow moulding) is different, that is to say the preliminary blow moulding pressure in this case is lower than the intermediate blow moulding pressure on average and the intermediate blow moulding pressure is on average lower than the final blow moulding pressure. In other words, the average pressure between the vertical lines P1 and Pi would be lower than the average pressure between the vertical lines Pi and P2 and this in turn would be lower than the average pressure between the vertical lines P2 and Sp. The average pressure between the lines Sp and E in turn is lower than the average pressure between the lines P2 and Sp.

Figure 6:
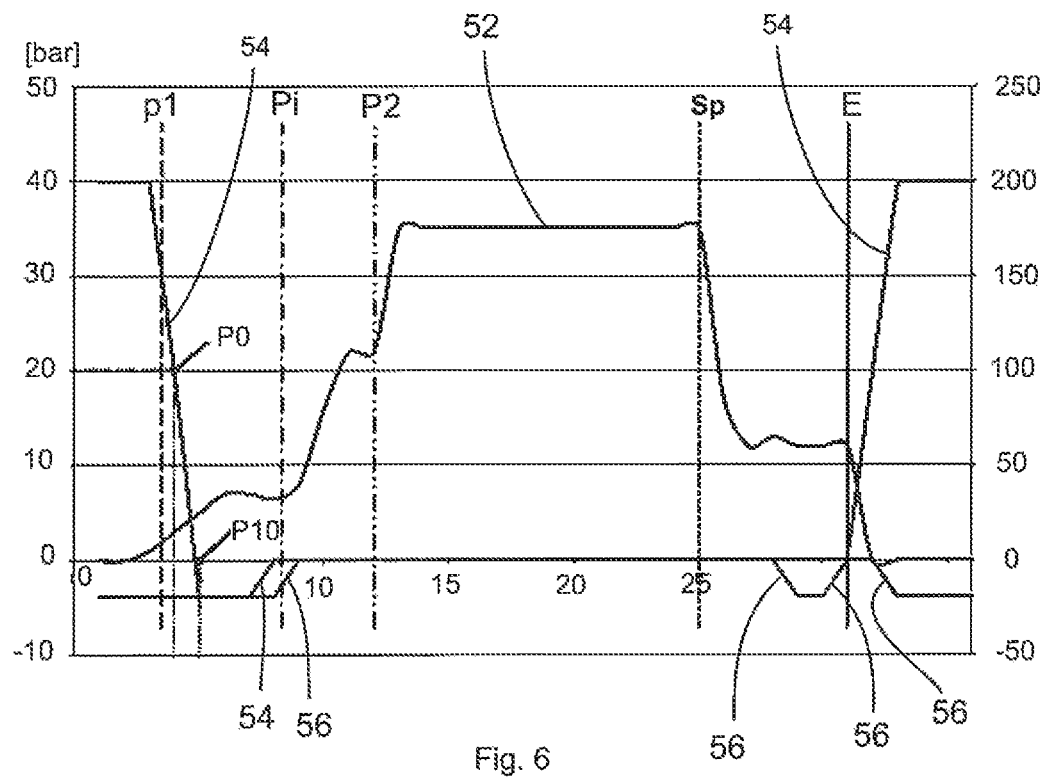
FIG. 6 shows a representation of a method according to the invention in a third embodiment according to the invention.

In the method shown in FIG. 6 the base part is first of all advanced towards the plastic parison before or during the application of the second pressure, and remains in this upwardly placed position until the application of the third pressure P2 is complete. Then, in the region between the vertical lines Sp and E the base part is briefly reset to its starting position and then advanced again towards the plastic parison. This takes place in the region of the pressure relief phase E. Lastly the base part is still pushed back into its starting position during the pressure relief phase. The stretching rod movement preferably does not follow these last described movements of the base part, but remains in a partially retracted position. Thus in this method the base part is advanced towards the plastic parison and also retracted again precisely twice. However, it would also be possible that the base part is advanced towards the plastic parison and (at least partially) retracted again more frequently than twice, for example three times or four times.

Figure 7:
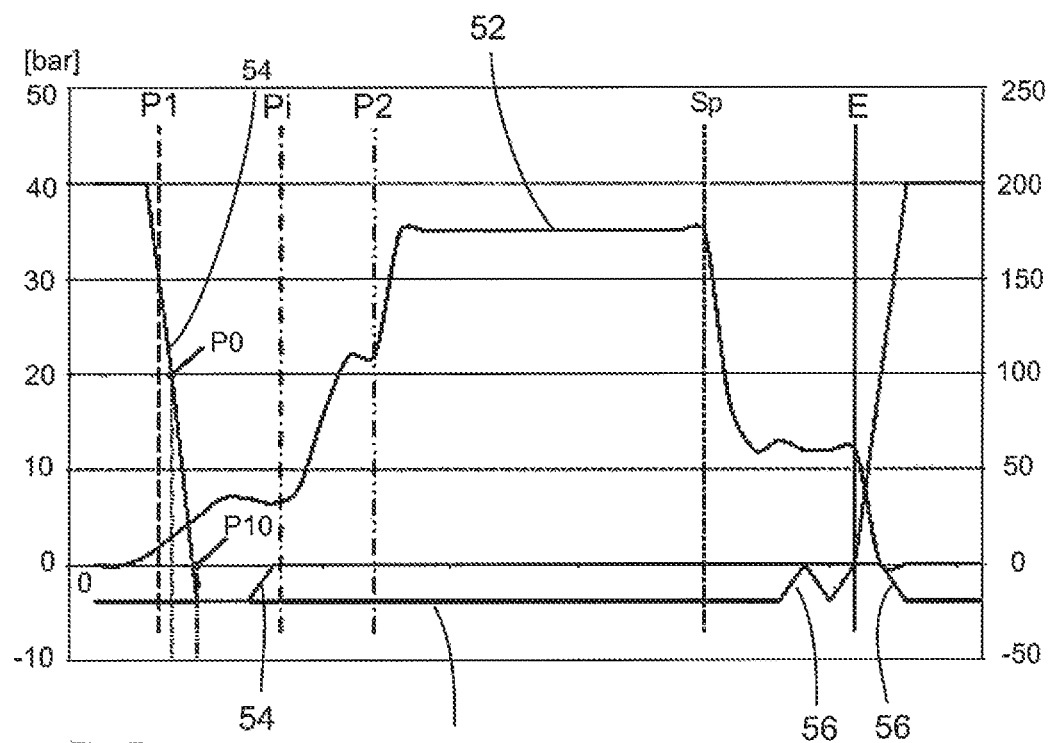
FIG. 7 shows a representation of a method according to the invention in the third embodiment.

FIG. 7 shows a further embodiment in a variant of that shown in FIG. 6. Also in this embodiment the base part is advanced and retracted again twice, albeit only after the application of the third pressure P2. It will be seen that here the base part is briefly advanced towards the plastic parison and immediately retracted again, in order then to be advanced once again towards the plastic parison or the now shaped plastic container. Also in this embodiment the base part is finally moved back again into its starting position.

Figure 8:
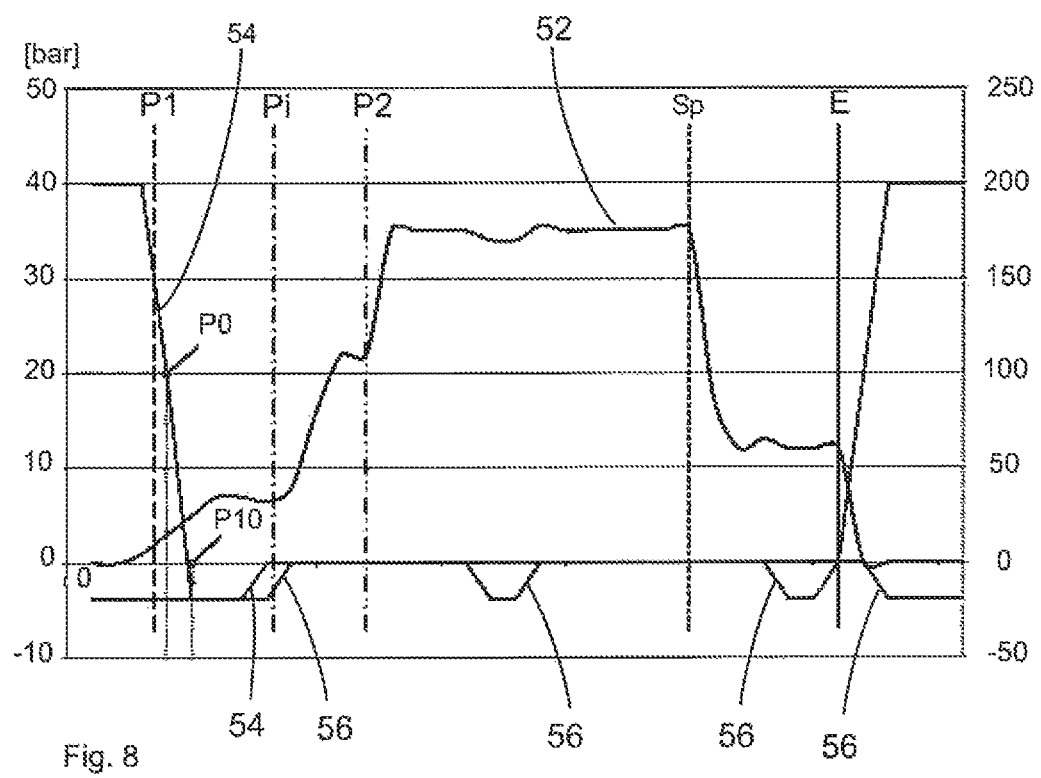
FIG. 8 shows a further representation of a method according to the invention in the third embodiment.

FIG. 8 shows a further embodiment of the method shown in FIG. 6. It will be seen that here the base part is first of all advanced during the P1 phase and the beginning Pi phase. Then, during the application of the third pressure P2 to the plastic parison, the base part is briefly retracted and again advanced towards the plastic parison. For a third time the base part is retracted during the rinsing phase Sp in order then to be advanced again towards the plastic parison (or towards the container which is already shaped at this time) during the pressure relief phase. Thus, in the method shown in FIG. 8 the base part is advanced towards the plastic parison and retracted again precisely three times. In this method a better control of the blow moulding speed is also possible. In particular control by adjustment of the second pressure Pi (that is to say the intermediate blow moulding pressure) is possible. Also in this way the container quality can be improved. A better control of the wall thicknesses is also possible.

The applicant reserves the right to claim all the features disclosed in the application documents as essential to the invention in so far as they are individually or in combination novel over the prior art. Furthermore it is pointed out that features which may be advantageous per se have also been described in the individual drawings. The person skilled in the art recognises immediately that a specific feature described in a drawing may also be advantageous without the incorporation of further features from this drawing. Furthermore the person skilled in the art recognises that advantages may also result from a combination of several features shown in individual drawings or in different drawings.

LIST OF REFERENCES 1 apparatus
2 carrier
4 lateral part carrier
10 plastic bottle (also plastic parison)
10a container base
14 blow mould lateral part
16 support shell
18 base part
15 cavity
20 transforming stations
32 blow moulding nozzle
34 rod-like body, stretching rod
36 driving device for movement of the base part 18
52 curve of the pressure profile
54 course of the stretching rod movement
56 course of the movement of the base part
P1 first pressure, preliminary blow moulding pressure
Pi second pressure, intermediate blow moulding pressure
P2 third pressure, final blow moulding pressure
Sp rinsing pressure
E relief (pressure)
P0, P10 positions of the stretching rod
Z axis of rotation
P transport path
WP1,WP2 inflection points of the pressure profile curve

The invention claimed is:

1. A method for transforming plastic parisons into plastic bottles, comprising the following steps in sequence:
   introducing a plastic parison which is to be expanded into a blow mould, wherein the blow mould has at least two lateral parts and a base part which is movable relative to the lateral parts in a longitudinal direction (L) of the plastic parison,
   inserting a rod-shaped body into an interior of the plastic parison through a mouth of the plastic parison,
   applying a first pressure (P1) to the plastic parison,
   applying a second pressure (Pi) to the plastic parison, wherein this second pressure (Pi) deviates from the first pressure (P1) and is higher than the first pressure (P1),
   applying a third pressure (P2) to the plastic parison, wherein this third pressure (P2) deviates from the second pressure (Pi) and is higher than the second pressure (Pi),
   wherein only after the third pressure (P2) is applied to the plastic parison, the base part is advanced towards the plastic parison in the longitudinal direction (L) of the plastic parison.

2. The method according to claim 1, wherein the rod-shaped body is at least partially retracted before or during the advancement of the base part.

3. The method according to claim 1, wherein the base part is advanced by a distance which is greater than 5 mm, preferably greater than 10 mm and particularly preferably greater than 15 mm and/or that the base part is advanced by a distance which is less than 30 mm, preferably less than 25 mm and particularly preferably less than 20 mm.

4. The method according to claim 1, wherein after the application of the third pressure (P2) the plastic parison is again relieved of pressure.

5. The method according to claim 1, wherein the base part is retracted again after the application of the third pressure (P2) to the plastic parison.

6. The method according to claim 1, wherein before the application of the third pressure (P2) to the plastic parison, the rod-shaped body is at least partially retracted.

7. The method according to claim 1, wherein the base part is advanced for a duration which is between 1 sec and 20 sec, preferably between 1 sec and 15 sec and preferably between 2 sec and 10 sec and particularly preferably between 2 sec and 5 sec.

8. The method according to claim 1, wherein the second pressure is greater than 3.5 bar, preferably greater than 5 bar, preferably greater than 7 bar and particularly preferably greater than 10 bar and preferably greater than 12 bar and/or the second pressure is less than 20 bar, preferably less than 18 bar, and particularly preferably less than 17 bar.

9. The method according to claim 1, wherein after the application of the third pressure (P2) a rinsing pressure (Sp) is applied to the plastic parison.

10. The method according to claim 5, wherein the base part is retracted again after rinsing of the plastic parison.

11. The method according to claim 5, wherein the base part is retracted again during pressure relief of the plastic container produced from the plastic parison.

12. The method according to claim 1, wherein after the third pressure (P2) is applied to the plastic parison, the base part is at least twice advanced towards and at least twice partially retracted from the plastic parison with the longitudinal direction of the plastic parison.

13. An apparatus for transforming plastic parisons into plastic bottles, the apparatus comprising:
- at least one transport device on which a plurality of transforming stations are arranged, wherein each of the transforming stations has a blow mould, each of which has two lateral parts, which are movable with respect to one another for opening and closing the blow mould;
- a base part, wherein the base part is movable relative to the lateral parts in a longitudinal direction (L) of the plastic parison and in a closed state of the blow mould;
- at least one application device configured to apply a gaseous medium to the plastic parisons for expansion thereof;
- a control device which controls the application of the gaseous medium to the plastic parisons, wherein, first of all, a first pressure (P1), then a second pressure (Pi) which is above the first pressure (P1), and finally a third pressure (P2) preferably above the second pressure (Pi), are applied to the plastic parisons; and
- a driving device configured to move the base part at least temporarily during the application of pressure to the plastic parisons, wherein only after the third pressure (P2) is applied to the plastic parison, the base part is advanced towards the plastic parison in the longitudinal direction (L) of the plastic parison.

14. The apparatus of claim 13, wherein the driving device is configured to move the base part at least temporarily during the application of pressure to the plastic parisons, wherein after the third pressure (P2) is applied to the plastic parison, the base part is at least twice advanced towards and at least twice partially retracted from the plastic parison in the longitudinal direction (L) of the plastic parison.

* * * * *